United States Patent
Fischer

(10) Patent No.: US 6,367,238 B1
(45) Date of Patent: Apr. 9, 2002

(54) ENERGY GUIDING CHAIN

(75) Inventor: Kurt Fischer, Hennef (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 09/622,293

(22) PCT Filed: Feb. 15, 1999

(86) PCT No.: PCT/DE99/00477

§ 371 Date: Nov. 2, 2000

§ 102(e) Date: Nov. 2, 2000

(87) PCT Pub. No.: WO99/42743

PCT Pub. Date: Aug. 26, 1999

(30) Foreign Application Priority Data

Feb. 20, 1998 (DE) ......................................... 198 07 083

(51) Int. Cl.⁷ ........................... F16G 13/16; H02G 15/24
(52) U.S. Cl. ............................. 59/78.1; 59/900; 248/49
(58) Field of Search ................... 59/78.1, 900; 248/49

(56) References Cited

U.S. PATENT DOCUMENTS

| | | | | |
|---|---|---|---|---|
| 2,975,807 A | * | 3/1961 | Waninger .................... | 59/78.1 |
| 3,053,358 A | | 9/1962 | Gross .......................... | 189/36 |
| 4,672,805 A | * | 6/1987 | Moritz ........................ | 59/78.1 |
| 4,840,023 A | * | 6/1989 | Borsani ....................... | 59/78.1 |
| 5,134,251 A | * | 7/1992 | Martin ......................... | 59/78.1 |
| 5,768,882 A | * | 6/1998 | Weber et al. ................. | 59/78.1 |
| 6,107,565 A | * | 8/2000 | O'Rourke .................... | 59/78.1 |

FOREIGN PATENT DOCUMENTS

| | | |
|---|---|---|
| DE | 1 131 480 | 6/1962 |
| DE | 26 09 451 | 3/1976 |
| DE | 249 742 | 6/1986 |
| DE | 41 19 211 | 6/1991 |
| DE | 94 09 082 | 6/1994 |

* cited by examiner

*Primary Examiner*—David Jones
(74) *Attorney, Agent, or Firm*—Drinker Biddle & Reath LLP

(57) ABSTRACT

Energy guiding chain (1) for housing and guiding ducts (2) between a fixed base (3) and a mobile driver (4). Said chain comprises two parallel plate-link lines consisting of platelinks (5) which are opposite to each other in a crosswise direction and connected by means of transverse links (7). Those plate-links (5) of each plate-link line which are directly adjacent have overlapping joint areas so that they can be pivoted in relation to each other in the direction of bending of the chain. At least in an area of the chain adjacent to the driver (4), the chain links (7a, 7b, 7c, 7d, 7e, 7f, 7g) are linked to each other in a traction-stable manner in several sections by means of at least one element (6) which is substantially non-extendible in the longitudinal direction of the chain and flexible in the direction of bending of the chain. The invention aims to ensure that the chain functions reliably especially in hot and humid environments. To this end, the chain links, in several sections of at least three links, and the driver (4) are fixed to the element(s) (6) in such a way that forces transmitted by the fixation to the chain links act approximately at the level of the pivoting axes of the chain links and the tension of the element(s) (6) in the longitudinal direction of the chain is such that it tends towards zero when the chain is thrust by the driver (4) or comes to halt after a thrust.

20 Claims, 11 Drawing Sheets

ENERGY GUIDING CHAIN

FIELD OF THE INVENTION

The invention relates to an energy guiding chain for housing and guiding energy transmission lines between a fixed base and a mobile driver. The chain comprises two parallel plate-link lines consisting of plate-links which are opposite to each other in a crosswise direction and connected by means of transverse links. Those plate-links of each plate-link line which are directly adjacent can be pivoted in relation to each other in the direction of bending of the chain and the chain forms a deflection area. At least in an area of the chain adjacent to the driver, the chain links are linked to each other in such a manner as to resist stretching under tension in several sections by means of at least one element which is substantially inextensible in the longitudinal direction of the chain and is flexible in the direction of bending of the chain.

BACKGROUND OF THE INVENTION

Today, energy guiding chains of this kind are largely made of plastic. Polyamides are a preferred plastic. Polyamides are hygroscopic, however, and like other plastic materials have the disadvantage that they have a relatively high coefficient of expansion in very humid and hot environments.

Energy guiding chains are used in different lengths and sizes under various conditions, such as in very humid and hot rooms or buildings. In long chains, the relatively high additional loads resulting from the energy transmission lines housed inside the chains cause high tensile and thrust stresses when the chain travels. In very hot rooms or buildings with high humidity of up to 100%, such as in composting plants where long chains are used, the change in length due to the tensile stress amounts to up to 8%. In a chain with a length of 100 m, the change in length adds up to 0.8 m.

As the energy transmission lines are connected to both the fixed base and the driver, the change in length of the chain due to tensile stress results in a difference in length between the energy transmission lines and the chain, meaning that the energy transmission lines are subjected to alternating tension. This tension has a particularly pronounced effect on the inside transverse members of the links in the deflection area of the chain. They are deformed and can even fracture.

When the chain is subject to compressive stress during the return or thrust travel of the driver, the chain tends to rise up in the area of the upper strand, i.e. the upper part of the bent chain, and to overlap, even if only weak upward force components act on it. The bending stresses that occur in the joint area of the overlapping chain links are then so high that the chain can easily break in this area.

An energy guiding chain of the kind specified in the opening paragraph is known from DE 26 09 451 B2. The inextensible elements, which are flexible in the bending direction of the chain, are mounted in the form of a cable or a chain on the underside of the chain links or transverse members, separately from the articulated joints. They serve to prevent the chain from sagging in the direction opposite the bending direction of the chain. Consequently, no stops are required for this purpose. Instead, the individual chain links of the upper strand are firmly pressed together and held in extended position by the inextensible element provided on the underside of the chain links. However, a self-supporting upper strand of this kind is not suitable for relatively long chains with relatively long travel paths.

In order to keep the upper strand stretched, the inextensible element must be mounted on at least every other chain link, as sagging cannot be prevented if the intervals are any greater. However, mounting the inextensible element on at least every other chain link makes manufacturing considerably more complex. Mounting the inextensible element on every other chain link is also a disadvantage in that the chain cannot relax sufficiently in the deflection area.

In order to keep the upper strand stretched, it is further necessary to pre-tension the inextensible element in the longitudinal direction of the upper strand. Because of this pretensioning, there is a tension difference between the chain and the inextensible element, particularly during thrust motion of the upper strand, which causes an upward force component. As mentioned above, there is a danger of the chain links of the upper strand rising up when the chain is under thrust, this possibly leading to the fracture of the chain in this area.

If the chain links are made of plastic, tension differences between the chain and the inextensible element that lead to an upward force component can occur particularly as a result of the thermal expansion of the plastic.

SUMMARY OF THE INVENTION

Therefore, an object of the present invention is to design an energy guiding chain in which a change in length due to tensile stress can be avoided relatively simply, even at high temperatures and high humidity, and in which the rising of the upper strand under tensile stress is prevented.

This object can be achieved by an energy guiding chain of the type specified in the opening paragraph in which the chain links, in several sections of at least three links, and the driver are fixed to the inextensible element(s) in such a way that forces transmitted by the fixation to the chain links act approximately at the level of the pivoting axes of the chain links and the tension of the element(s) in the longitudinal direction of the chain falls towards zero when the chain is thrust by the driver or comes to a halt after a thrust.

The fact that the chain links are mounted on the inextensible element(s) in sections of at least three chain links ensures sufficient relaxation of the chain in the deflection area. As the forces transmitted to the chain links through the mount act approximately at the level of the pivoting axes of the chain links, tension differences between the chain and the inextensible element(s) cannot cause an upward force component that could be feared to cause the upper strand to rise under thrust against the weight of the chain and the energy transmission lines. The tension of the inextensible element(s) is adjusted in such a way that, when the chain is thrust or comes to a halt after a thrust, only little or no force acts on the articulated joints of the chain links, so that, in particular, the pivoting motion of the chain links in the deflection area is not restricted.

Energy guiding chains are already known (DE 94 09 082 U1, DD 249 742 A 1, DE 1 131 480 C1) in which the chain links are connected to one another in a central area by inextensible elements that are flexible in the bending direction of the chain. Due to their flexibility, the inextensible elements form articulated connections between the chain links instead of overlapping joint areas. In these chains, however, the inextensible elements are not mounted to the chain links at intervals of at least three chain links and to the driver. Furthermore, the publications in question do not indicate that the tension of the inextensible element(s) in the longitudinal direction of the chain tends towards zero when the chain is thrust by the driver or comes to a halt after a thrust.

In a preferred configuration of the invention, the chain links are mounted on the inextensible element(s) in sections corresponding to at least the arc length extending over 180° of the deflection area of the chain.

The forces transmitted through the mounting to the chain links preferably act within an area that is approximately at the level of the pivoting axes of the chain links and extends one-quarter of the link height above and below the level of the pivoting axes. It is particularly advantageous for the forces to act within an area that extends one-sixth of the link height above and below the pivoting axes.

The sections in which the chain links are mounted on the inextensible element(s) can be of identical or different length. Preferably, various lengths are used and the sections become smaller towards the driver, because the tensile stress of the chain increases towards the driver.

There are preferably between 2 and 5 sections per 50 m chain length.

The chain link of the section-wise division that is nearest to the driver is preferably not the chain link directly adjacent to the driver, but rather a chain link positioned at a distance of several chain links away that forms the end of the first section.

The part of the chain, adjacent to the driver, in which the inextensible element(s) is/are arranged, preferably extends over the entire upper strand and the bending area of the chain and into the lower strand when the chain is in a central position of travel, in which the upper strand and lower strand are of roughly the same length.

The inextensible element, or at least one of the inextensible elements, is preferably positioned roughly in the middle of the inside of the chain. At least one element can also positioned to the outside within the chain, in the vicinity of the plate-links.

In particular, the element, or at least one of the elements, can be a steel cable. Steel cables have the advantage that they have very low extensibility and can be bent without generating tension. However, any other element that displays these properties can also be used. For example, a metal chain, a horizontally arranged metal strip or an inextensible, flexible belt can also be used.

As the bending of the steel cable, or of any other corresponding element, in the bending area of the chain occurs without tension, the steel cable is relaxed in this area, so that the bending of the chain is not restricted by the steel cable. In the upper strand of the chain, where tensile forces act when the chain is pulled, the steel cable or corresponding element is taut in the longitudinal direction of the chain, meaning that it can absorb the tensile stress when tensile forces begin to act on the chain.

In a preferred configuration of the invention, adjacent ones of the chain links located at the ends of the individual sections are connected to one another and, of these, the chain link nearest to the driver is connected to driver, in such a manner as to resist stretching, by at least one element that is inextensible in the longitudinal direction of the chain and flexible in the bending direction of the chain.

Two taut cables or corresponding elements are preferably positioned between each pair of adjacent chain links located at the ends of individual sections and between the one of these chain links nearest to the driver and the driver.

The inextensible element(s) is/are preferably mounted on rails located separately from the transverse members that are connected to the opposite plate-links of the chain links.

In an expedient embodiment of the invention, the energy transmission lines guided in the chain are mounted on these rails by means of clamping blocks, and the rails also have mounting elements for the ends of the steel cables or other corresponding inextensible elements.

The rails can have pins on their ends, which lie in the transverse direction of the chain, that act as the link pins of the associated chain links. This means that the pins on the rails positively engage two flush openings in the overlapping areas of two adjacent chain links and thus form the pivoting axes of these chain links. This arrangement permits the energy transmission lines and separate, inextensible elements mounted on the rails to be arranged in oscillating fashion about the pivoting axes.

In another, preferred configuration, the ends of the rails lying in the transverse direction of the chain have projections that engage correspondingly designed grooves on the insides of the chain links between the joint areas. This arrangement permits the use and replacement of the design according to the invention without changing the associated chain links in any other way. The grooves provided in all chain links of a chain series can also be used for mounting other parts between the plate-links.

BRIEF DESCRIPTION OF THE DRAWINGS

Embodiments of the invention are described in more detail below based on the drawings. The drawings show the following.

DETAILED DESCRIPTION OF THE DRAWINGS

Figure 1:
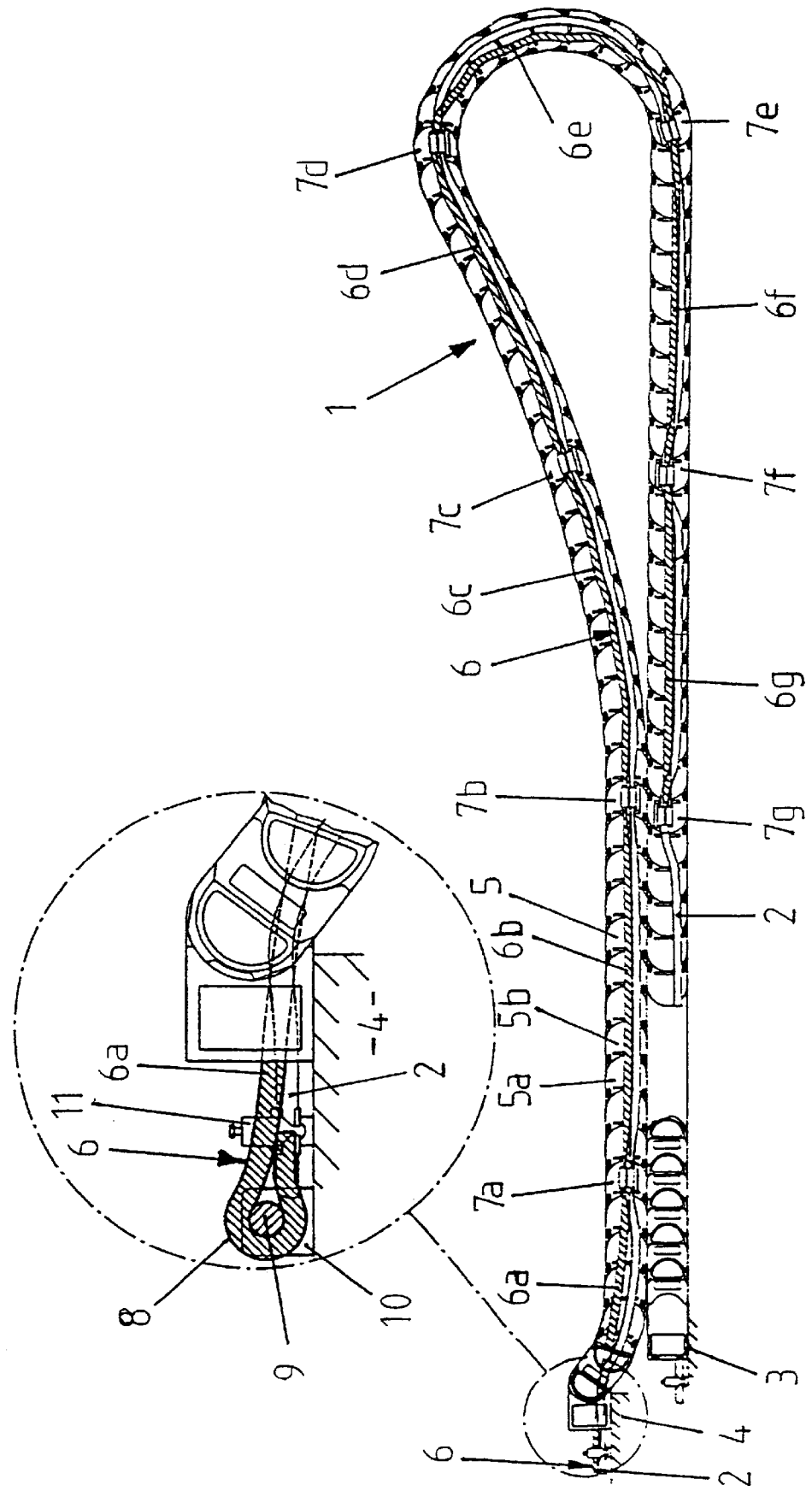
FIG. 1 A cross-sectional side view of a first embodiment.

The overall view in FIG. 1 shows an energy guiding chain 1 for housing and guiding energy transmission lines 2 between a fixed base 3 and a mobile driver 4. Said chain comprises two parallel plate-link lines consisting of plate links 5 which are opposite to each other in a transverse direction and connected by means of transverse members 7. Those plate-links 5a and 5b of each plate-link line which are directly adjacent can be pivoted in relation to each other in the direction of bending of the chain. The pivoting connection between plate-links 5a and 5b can consist of pins and openings (not shown) arranged in their overlapping joint area. The minimum pivoting radius is set in the bending direction and against the bending direction by interacting stops on plate-links 5a and 5b.

As further shown in FIG. 1, inextensible elements 6 (specifically 6a, 6b, 6c, 6d, 6e, 6f and 6g) that are flexible in the bending direction of the chain are provided in a section of the chain extending from driver 4, via the upper strand and the bending area, to the lower strand of the chain. These elements connect chain links 7a, 7b, 7c, 7d, 7e, 7f and 7g to one another, these being spaced several chain links apart so as to define sections of chain and spaced away from driver 4 in the corresponding area of the chain. Chain link 7a, which is nearest to driver 4, is connected to driver 4 by inextensible element 6a.

Inextensible elements 6a, 6b, 6c, 6d, 6e, 6f and 6g are designed as steel cables. As can be seen in the enlargement in FIG. 1, the steel cable of element 6a is mounted on a mounting element 10 of driver 4 by way of a loop 8 that engages around a bolt 9. Energy transmission lines 2 are also mounted on driver 4 by bell-shaped mounting elements 11. Energy transmission lines 2 also serve as strretch-resisting elements in the chain. Like the steel cables, they are fixed in chain links 7a, 7b, 7c, 7d, 7e, 7f and 7g.

As shown in FIG. 1, inextensible element 6 is taut in the longitudinal direction of the chain in the horizontal chain links, particularly in the upper strand. This applies to individual elements 6a, 6b, 6c, 6d, 6e, 6f and 6g. Consequently, during the pulling motion of driver 4, inextensible element 6 absorbs the tensile forces of the chain in the sections of the upper strand, particularly towards driver 4, so that the plastic chain links do not stretch elastically.

In the bending area of the chain, the linear orientation of inextensible element 6 in the horizontal plane causes element 6 to be relaxed inside the chain in this area. In FIG. 1, this specifically applies to element 6e. Due to its relaxed arrangement, inextensible element 6 cannot impair the unrestricted bending of the chain.

Figure 2:
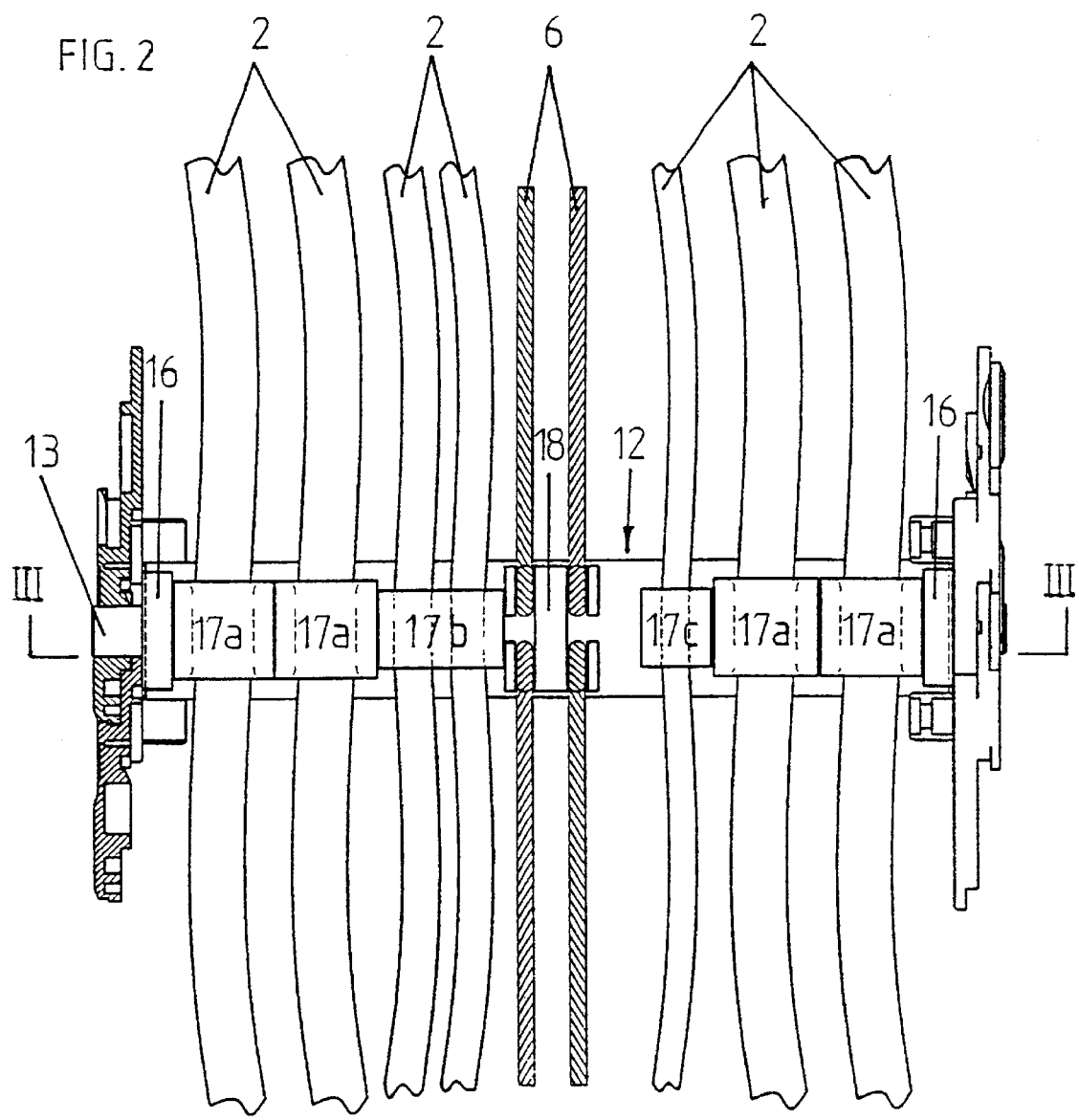
FIG. 2 A top view of a connection point of the inextensible elements in the chain, FIG. 3 A cross-section through the chain along Line III—III in FIG. 2, FIG. 4 A top view of a connection point in a second embodiment, FIG. 5 A cross-section through the chain along Line V—V in FIG. 4, FIG. 6 A top view of a connection in a third embodiment, FIG. 7 A top view of a connection point in a fourth embodiment, FIG. 8 A top view of a connection point in a fifth embodiment during thrust motion of the chain, FIG. 9 A top view according to FIG. 8 during pulling motion of the chain, FIG. 10 A top view of a connection point in a sixth embodiment during thrust motion of the chain, and FIG. 11 A top view according to FIG. 10 during pulling motion of the chain.
Figure 3:
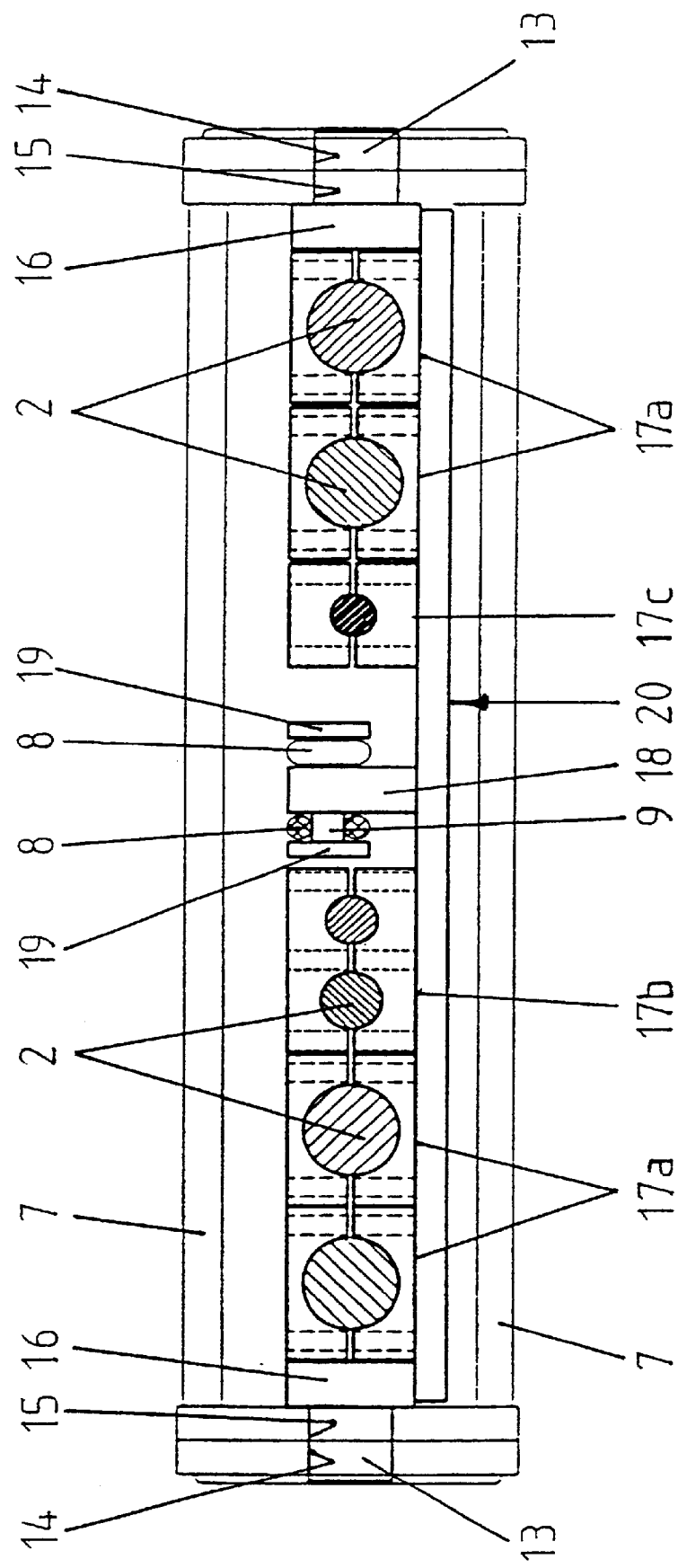

The mounting of inextensible element 6 and energy transmission lines 2 on chain links 7a, 7b, 7c, 7d, 7e, 7f and 7g is shown in more detail in FIGS. 2 and 3 for a first embodiment. A rail 12 made of metal is provided for mounting, the ends of which extend in the transverse direction of the chain and are provided with pins 13, which act as the link pins of the associated chain links. To this end, pins 14 and 15 extend positively through two flush openings in the overlapping joint areas of the adjacent chain links and thus form their pivoting axes.

As shown particularly clearly in FIG. 3, rail 12 has a U-shaped profile, where pins 13 are arranged on legs 16 of the U-profile. Legs 16 can be integrally moulded on the horizontal part of rails 12 or mounted on them, e.g. with screws.

Clamping blocks 17a, 17b and 17c are mounted next to legs 16 with the help of screws, which firmly clamp energy transmission lines 2.

In addition, a mounting element 18 is positioned in the middle of rail 12 in order to fix the ends of inextensible element 6, which connects the chain link to the two adjacent chain links of the two adjacent sections or to driver 4. Each connection consists of two steel cables. In order to fix the steel cables, they are connected by a loop 8 to bolts 9 running in the transverse direction through mounting element 18, as on driver 4 shown in FIG. 1. Radial expansions 19 on the ends of bolts 9 prevent loops 8 from slipping off sideways.

As shown more precisely in FIG. 2, two bolts 9 are provided on mounting element 18, where the looped ends of the two steel cables extending to the chain links at the ends of the adjacent sections are mounted on either side of mounting element 18.

Figure 4:
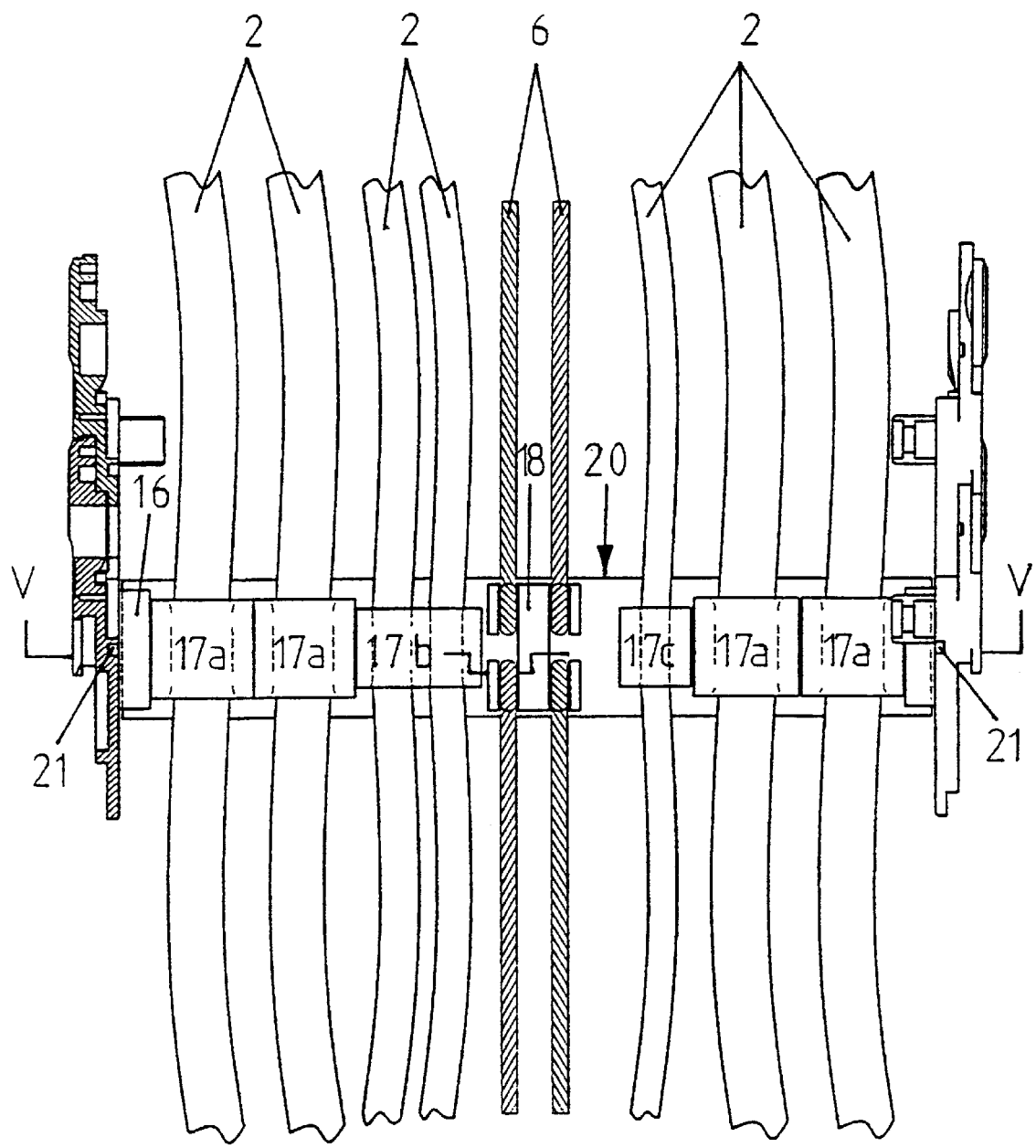
Figure 5:
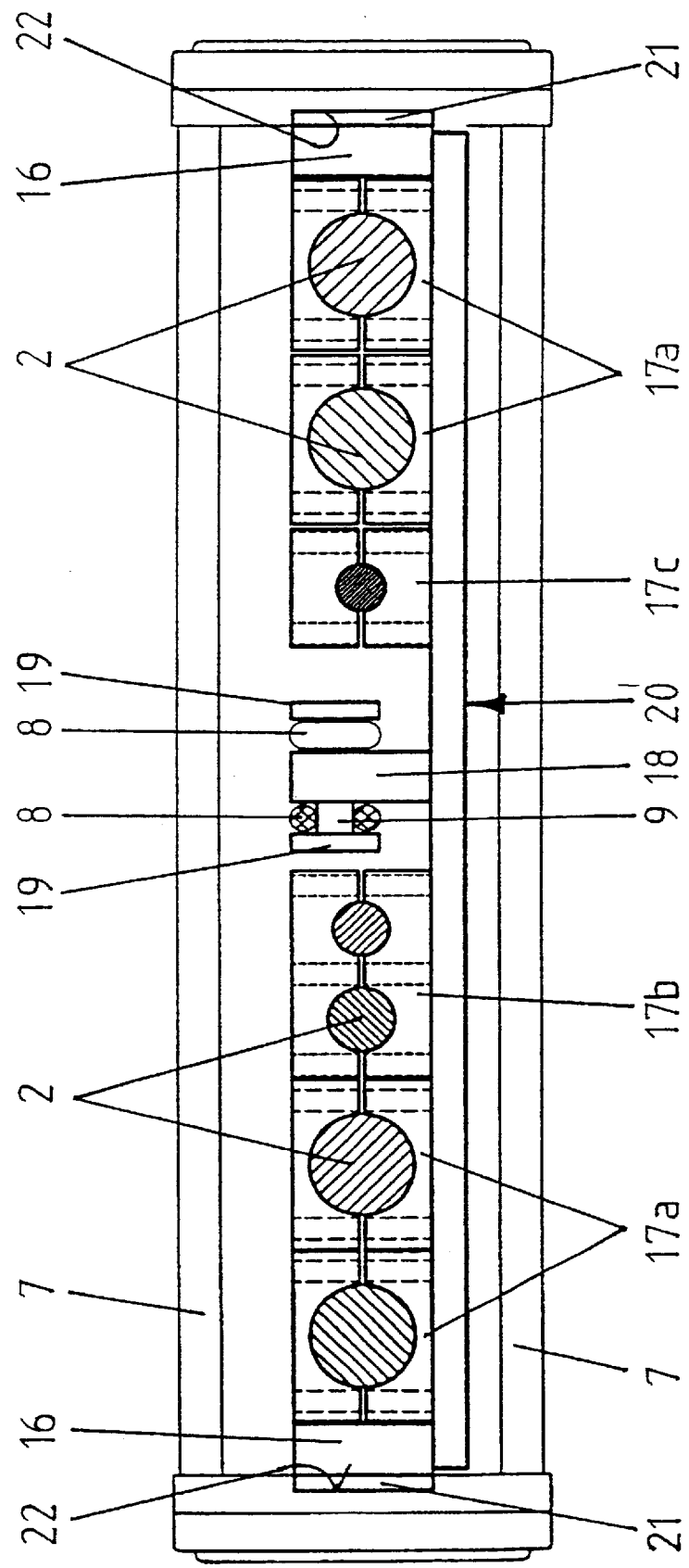

The mounting of the steel cables and energy transmission lines 2 on a rail described above is shown in a second configuration in FIGS. 4 and 5. In this embodiment, the ends of rails 20, lying in the transverse direction of the chain, are provided with projections 21, which engage correspondingly formed grooves 22 on the insides of the chain links between the joint areas. As is shown particularly clearly in FIG. 5, rail 20 is also of U-shaped design, where projections 21 are arranged on the outside of legs 16. The arrangement shown in FIGS. 4 and 5 is otherwise the same as that shown in the first embodiment in FIGS. 2 and 3.

Figure 6:
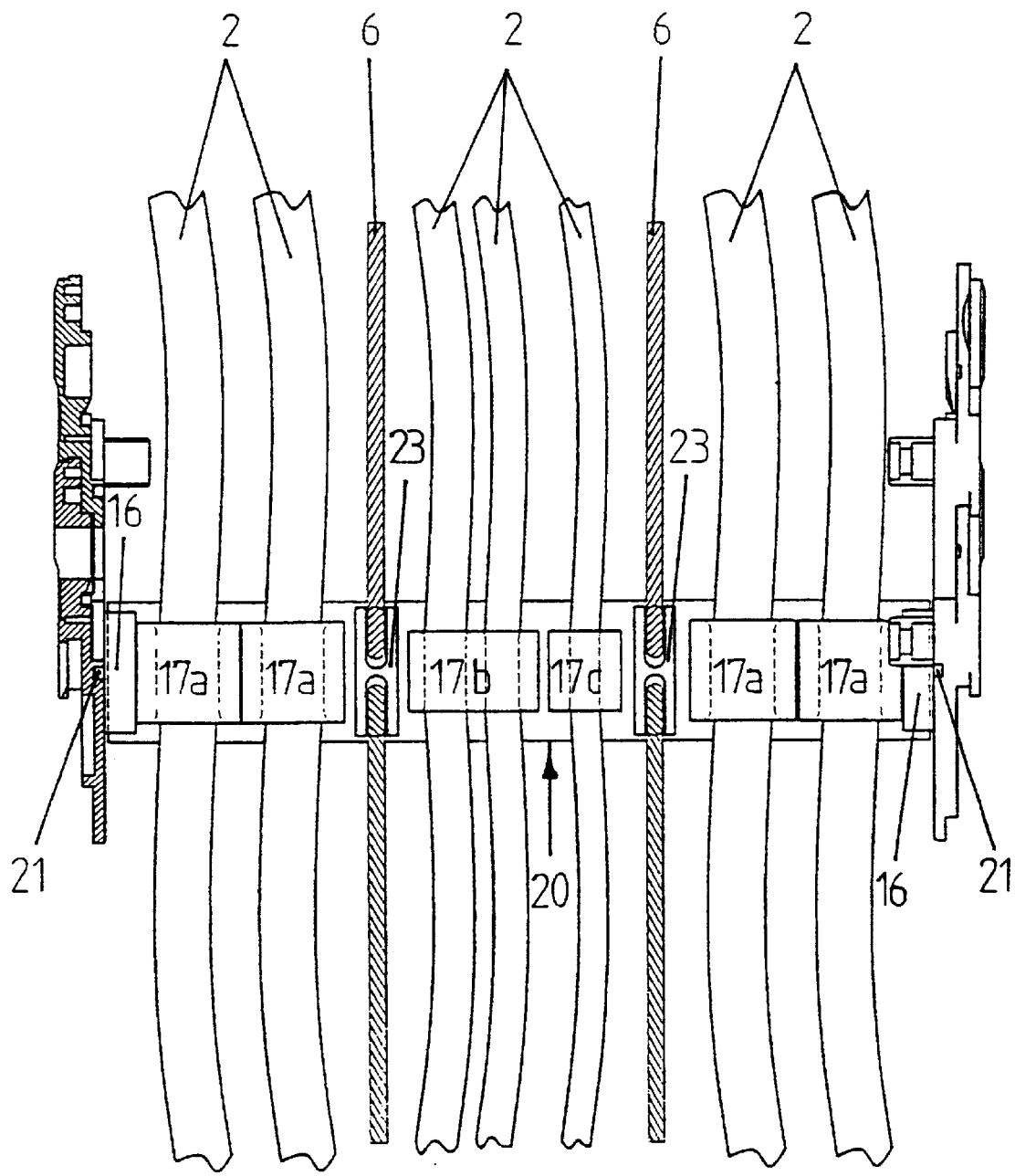

While the two embodiments described above show a central arrangement of the steel cables on rails 12 and 20, the steel cables in the third embodiment shown in FIG. 6 are positioned between energy transmission lines 2 in symmetrical fashion about the center of the chain. Mounting elements 23 are used for this purpose, which have opposing recesses in the longitudinal direction of the chain, in which the looped ends of the steel cables are mounted on bolts.

Figure 7:
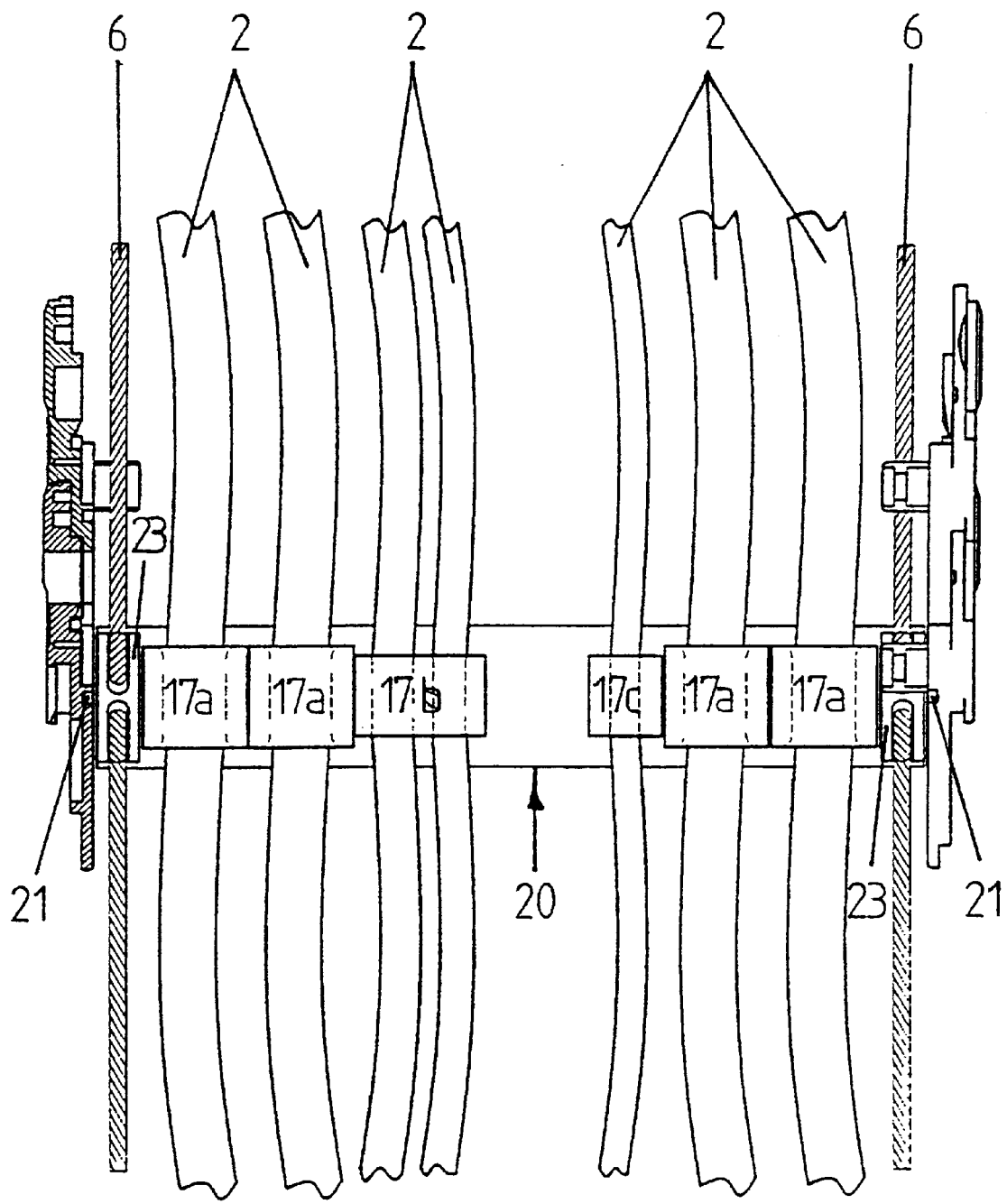

The embodiment shown in FIG. 7 shows a variation of the embodiment according to FIG. 6, in which the steel cables are mounted outside of the energy transmission lines 2 on rail 20. The arrangement is otherwise identical to the embodiment shown in FIG. 6.

Two further embodiments are shown in FIGS. 8 and 9 and 10 and 11. In these embodiments, one or more special energy transmission lines 2, which are essentially inextensible in the longitudinal direction, are used as the inextensible element(s).

Figure 8:
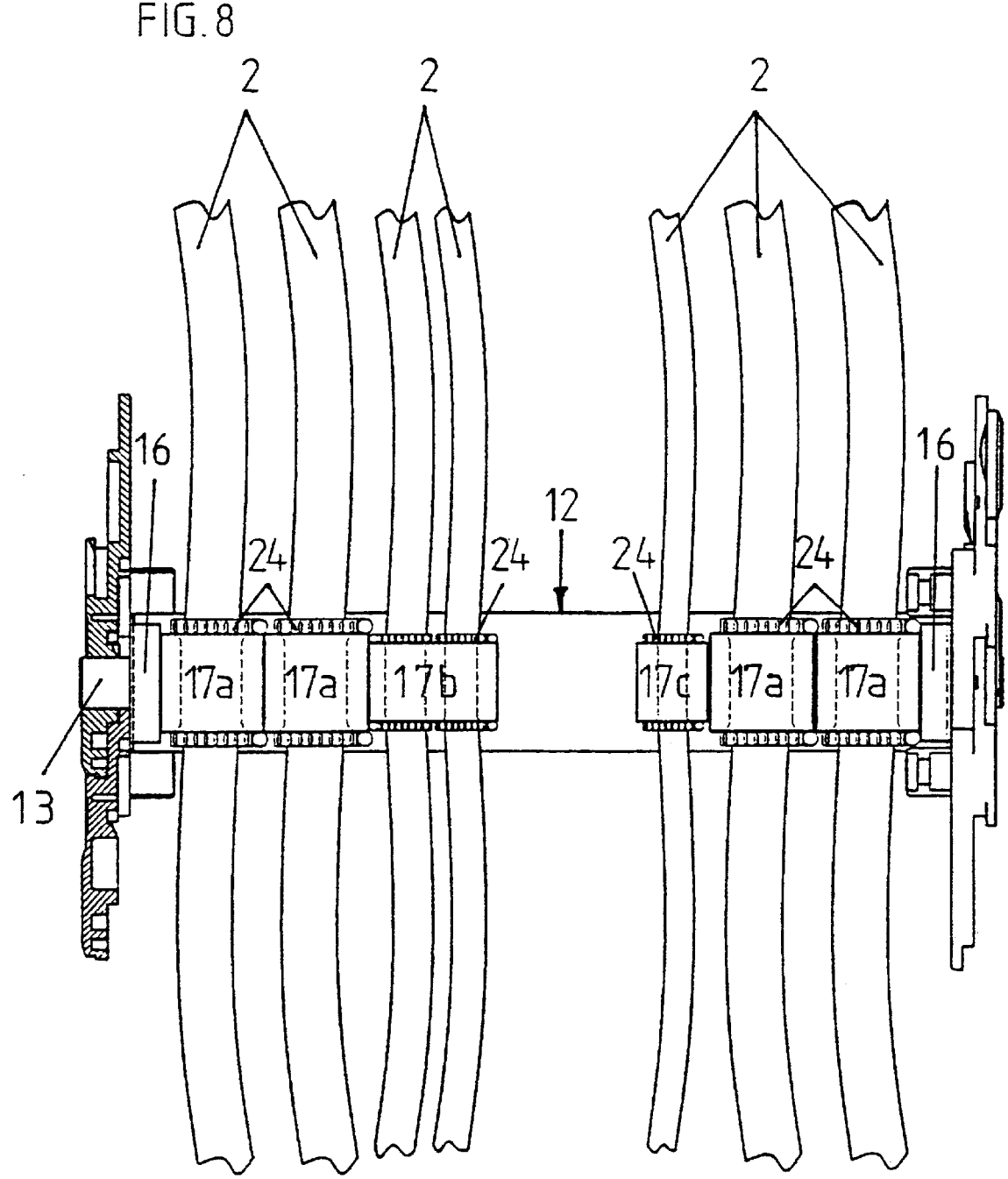
Figure 9:
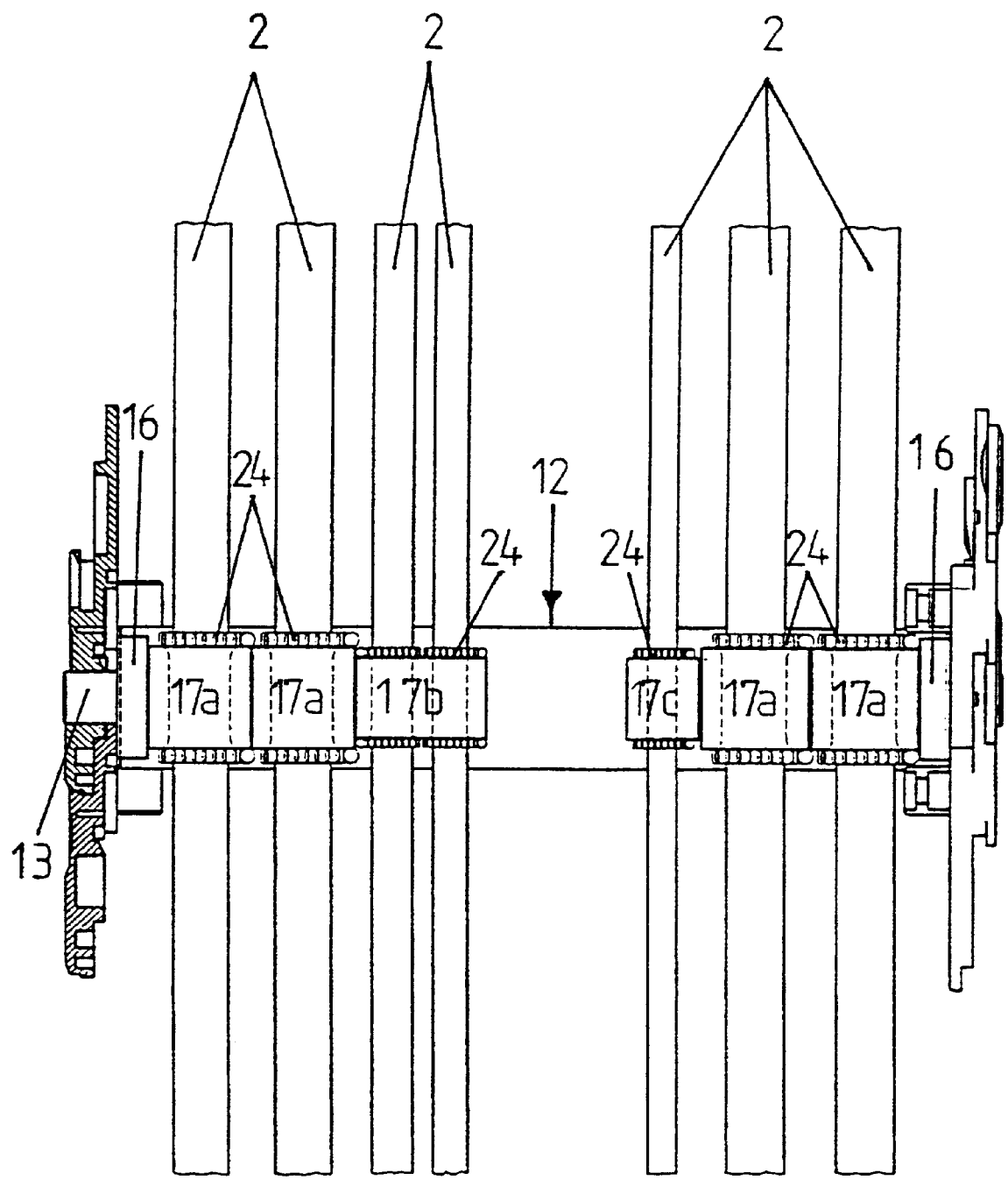
Figure 10:
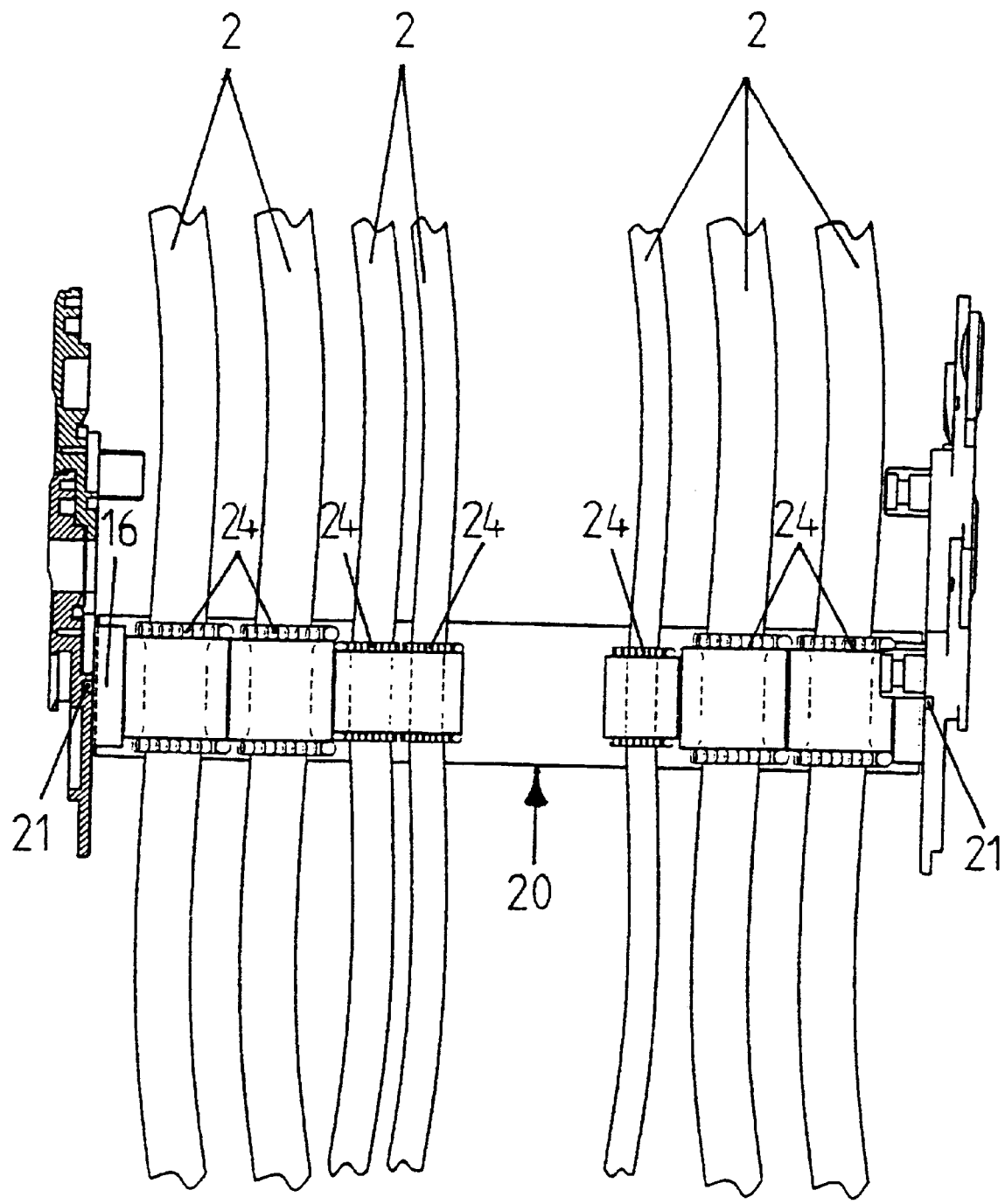

The embodiment shown in FIGS. 8 and 9 corresponds to the arrangement in the embodiment shown in FIGS. 2 and 3. Energy transmission lines 2 are mounted by means of clamping blocks 17a, 17b and 17c on a rail 12, which has pins 13 on the ends, lying in the transverse direction, of the chain that act as link pins for the two adjacent chain links.

In order to protect the energy transmission lines 2, they are, in the area in which they are fixed by clamping blocks 17a, 17b and 17c, surrounded by collars 24, with which they are inserted into the clamping blocks. Collars 24 protrude on both face ends of the clamping blocks. Collars 24 are designed as sleeves of elastic material that have been slit along their length and are attached to energy transmission lines 2 in pre-tensioned fashion by screws on the edges extending along the length of the slit. In this way, energy transmission lines 2 cannot shift in clamping blocks 17a, 17b and 17c, even under high tensile stress.

FIG. 8 shows the arrangement in a situation in which the chain moves in the thrust direction, i.e. when no tensile stress is acting on the chain links. As shown in FIG. 8, energy transmission lines 2 are relaxed in the chain, and are not subject to tensile stress.

In the situation shown in FIG. 9, the chain is moving in the pulling or tension direction, so that energy transmission lines 2 are subjected to a tensile stress due to the elongation of the chain links. They are taut in the longitudinal direction of the chain because of the tensile stress.

10 and 11 show an arrangement that corresponds to the one in the embodiments shown in FIGS. 4 and 5. Rails 20, on which energy transmission lines 2 are mounted, have projections 21 on the ends lying in the transverse direction of the chain that engage correspondingly designed grooves 22 on the insides of the chain links between the joint areas. The mounting of energy transmission lines 2 on rail 20 is identical to the embodiment shown in FIGS. 8 and 9.

FIG. 10 again shows a situation in which the chain moves in the thrust direction (as in FIG. 8), so that energy transmission lines 2 are relaxed.

Figure 11:
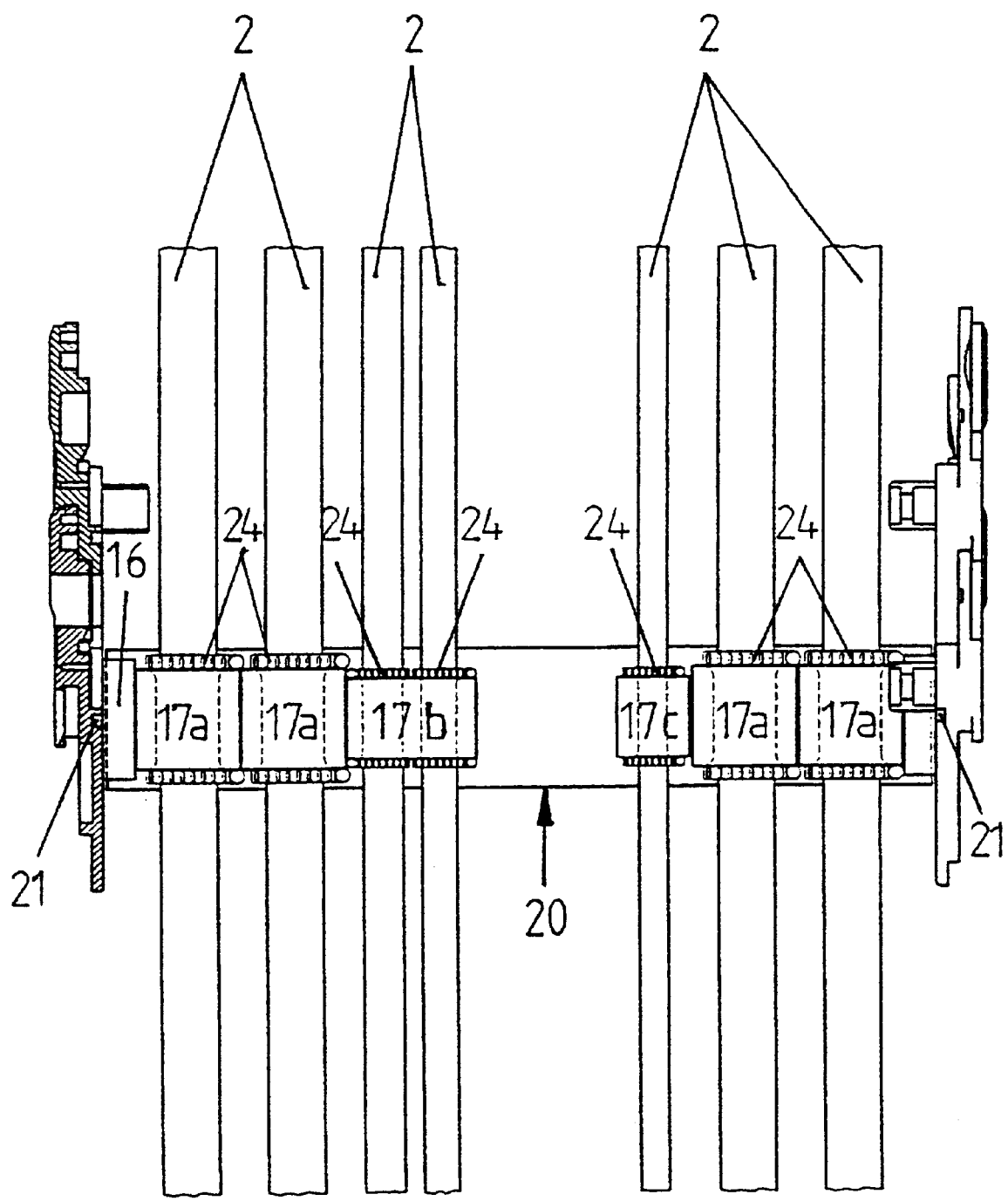

Finally, FIG. 11 shows a situation (as in FIG. 9) in which the chain moves in the tension direction and energy transmission lines 2 absorb the tensile forces transmitted to energy transmission lines 2 by the elongation of the chain links.

List of Reference Numbers

1 Energy guiding chain
2 Energy transmission lines
3 Fixed base
4 Driver
5 Plate-link
5a Adjacent plate-link
5b Adjacent plate-link
6 Inextensible element
6a Inextensible element
6b Inextensible element
6c Inextensible element
6d Inextensible element
6e Inextensible element
6f Inextensible element
6g Inextensible element
7 Transverse member
7a Chain link
7b Chain link
7c Chain link
7d Chain link
7e Chain link
7f Chain link
7g Chain link
8 Loop
9 Bolt
10 Mounting element
11 Mounting element
12 Rail
13 Pin
14 Opening
15 Opening
16 Leg
17 Clamping block
17a Clamping block
17b Clamping block
17c Clamping block
18 Mounting element
19 Expansion
20 Rail
21 Projection
22 Groove
23 Mounting element
24 Collar

What is claimed is:

1. Energy guiding chain for housing and guiding energy transmission lines between a fixed base and a mobile driver, said chain comprising:

two parallel plate-link lines consisting of plate-links which are opposite to each other in a direction transverse to the length of the chain and are connected by transverse members to form chain links, wherein those plate-links within each of said plate-link lines which are directly adjacent have overlapping joint areas at which they are connected so as to define axes about which the adjacent chain links are pivotable in relation to each other to permit bending of the chain; and at least one element which is substantially inextensible in the longitudinal direction of the chain and flexible in the direction of bending of the chain and which joins the chain links to each other in several sections of at least three links, wherein the chain links in said several sections and the driver are fixed to the element(s) in such a way that forces transmitted by the fixation to the chain links act approximately through the pivoting axes of the chain links and the tension of the element(s) in the longitudinal direction of the chain is such that it falls towards zero when the chain is thrust by the driver or comes to a halt after a thrust.

2. An energy guiding chain according to claim 1, wherein said adjacent plate links are so connected as to determine a minimum radius of bending of said chain, and wherein the chain links are mounted on the inextensible element(s) in sections corresponding to at least the arc length extending over 180° of the chain when bent at said minimum radius.

3. An energy guiding chain according to claim 1, wherein the inextensible element, or at least one of the inextensible elements, is positioned roughly in the middle on the inside of the chain.

4. An energy guiding chain according to claim 1, wherein at least one element is positioned within the chain in the vicinity of the plate-links of one of said plate link lines.

5. An energy guiding chain according to claim 1, wherein the inextensible element, or at least one of the inextensible elements, is a steel cable.

6. An energy guiding chain according to claim 3, wherein adjacent ones of the chain links defining the sections are connected to one another and, of these, the chain link nearest to the driver is connected to the driver by at least one inextensible element.

7. An energy guiding chain according to claim 1, wherein the inextensible element(s) is/are mounted on rails that are separate from the transverse members and are connected to the opposite plate-links of the chain links.

8. An energy guiding chain according to claim 7, wherein the lines guided in the chain are mounted on the rails by means of clamping blocks and the rails have mounting elements for the ends of steel cables.

9. An energy guiding chain according to claim 7, wherein the rails have ends lying in said transverse direction of the chain and have pins on said ends, which pins engage two flush openings in two adjacent chain links and thus form the pivoting axes of these chain links.

10. An energy guiding chain according to claim 7, wherein the rails have ends lying in the transverse direction of the chain and said ends have projections that engage correspondingly designed grooves on the insides of the plate links between the joint areas.

11. An energy-guiding chain for housing and guiding energy transmission lines between a fixed base and a mobile carrier, the chain comprising:

links, each link comprising:
two plate-links on opposite sides of the chain; and
a transverse members joining together the plate-links on opposite sides of the chain;
the plate-links on the same side of adjacent links being pivoted together at overlapping joint areas so as to permit the adjacent links to pivot about a pivoting axis extending from side to side of the chain and thereby permitting the chain to bend in a bending direction, each link having a height in a direction perpendicular to its side to side direction and to the lengthwise direction of the chain; and at least one element that is substantially inextensible in the longitudinal direction of the chain and is flexible in the bending direction and is attached to selected ones of said links and to said driver;

wherein said selected ones of said links are at least three links apart, thereby defining several sections of at least three links, and wherein said at least one element is attached to the selected links and to the driver in such a manner that the forces exerted by said at least one member on the selected links act substantially at the same height as the pivoting axes of the respective links, and wherein the tension in said at least one inextensible element falls substantially to zero when the respective section of the chain is being moved in thrust.

12. An energy guiding chain according to claim 11, wherein said adjacent plate-links are so connected as to determine a minimum radius of bending of said chain, and wherein the length of each said section is at least equal to the arc length of 180° of the chain when bent at said minimum radius.

13. An energy guiding chain according to claim 11, wherein at least one said inextensible element is positioned roughly in the middle of the chain.

14. An energy guiding chain according to claim 11, wherein at least one said inextensible element is positioned within the chain outside the energy transmission lines, in the vicinity of the plate-links of one side of the chain.

15. An energy guiding chain according to claim 11, wherein adjacent ones of said selected links are connected to one another, and the selected link nearest to the driver is connected to the driver, by said at least one inextensible element.

16. An energy guiding chain according to claim 11, wherein at least one said inextensible element is a steel cable.

17. An energy guiding chain according to claim 11, wherein at least one inextensible element is mounted on rails that are separate from the transverse members, and each said rail is connected at its ends to the opposite plate-links of a respective link.

18. An energy guiding chain according to claim 17, wherein the energy transmission lines guided in the chain are mounted on the rails by means of clamping blocks and the rails have mounting elements for the ends of steel cables.

19. An energy guiding chain according to claim 17, wherein the rails have pins on their said ends, each said pin engages two flush openings in two adjacent plate-links, and the pins on the ends of a said rail thus form the pivoting axis of the respective chain links.

20. An energy guiding chain according to claim 17, wherein said ends of the rails have projections that engage correspondingly designed grooves on the insides of the plate-links between the joint areas.

* * * * *